No. 837,489. PATENTED DEC. 4, 1906.
E. V. MYERS.
FISHING REEL.
APPLICATION FILED SEPT. 18, 1906.
FIG. 1.
FIG. 2.
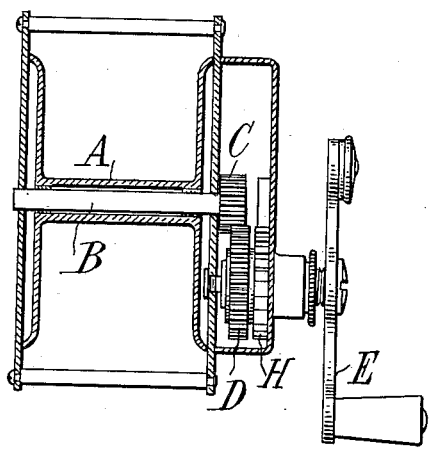
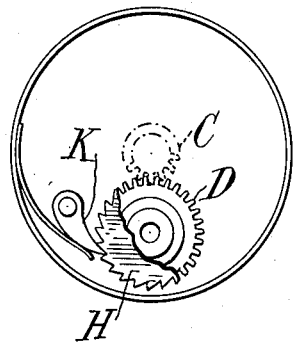
FIG. 3.
FIG. 5.
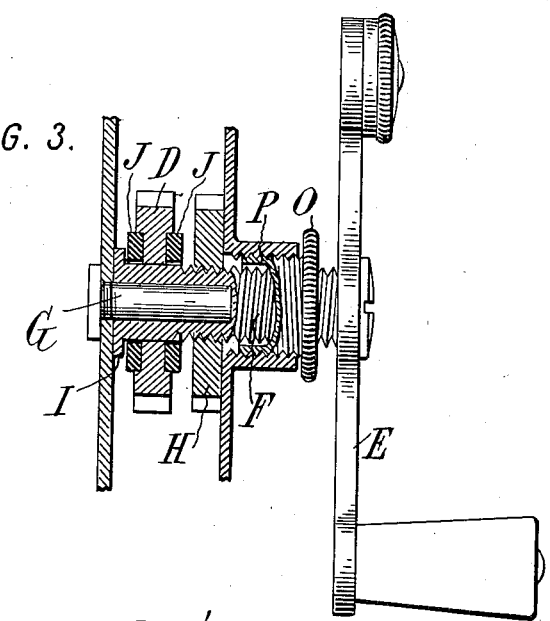
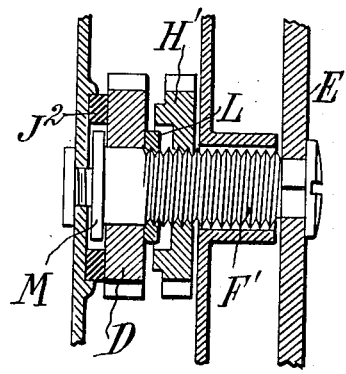
FIG. 4.
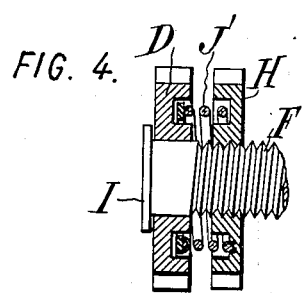
FIG. 6.
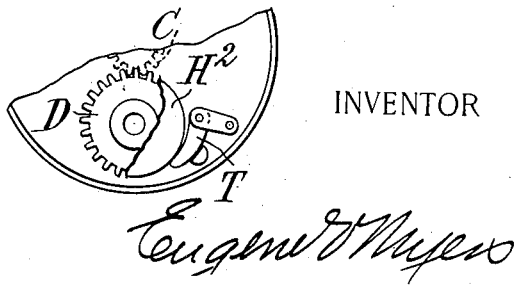
WITNESSES:
INVENTOR
Eugene V. Myers

UNITED STATES PATENT OFFICE.

EUGENE V. MYERS, OF EAST ORANGE, NEW JERSEY.

FISHING-REEL.

No. 837,489.     Specification of Letters Patent.     Patented Dec. 4, 1906.

Application filed September 18, 1906. Serial No. 335,100.

*To all whom it may concern:*

Be it known that I, EUGENE V. MYERS, a citizen of the United States, residing at East Orange, in the county of Essex, State of New Jersey, have invented certain new and useful Improvements in Fishing-Reels, of which the following is a specification.

This invention relates to fishing-reels, and aims to provide certain improvements therein.

Various devices have heretofore been proposed for producing a braking effect upon the line. These have usually taken the form of a separate braking device arranged to bear against the spool or some part in connection therewith. Such devices have been actuated by a separate lever, adapted to be operated by the left hand of the user, the right hand being unavailable for this purpose, since it must be kept upon the handle of the reel in playing the fish. Such devices are cumbersome and have the additional disadvantage that the left hand of the user has all the work it can do in holding the rod. A further disadvantage is that the handle must be released temporarily by the right hand and then regained when it is desired to reel in the line. Other devices have been proposed, but these have either been invariable in their action, such as the usual click and drag, or else have required so much time to adjust as to be incapable of variation while playing the fish.

By my invention I provide a device which is operable by the right hand of the operator and is capable of complete control, so that the tension upon the line may be instantaneously varied during the playing of the fish.

To this end my invention consists of means connected with the handle or capable of being operated by the right hand without releasing the latter for producing a braking effect upon the line.

In its preferred form my invention comprises a brake which is connected with the handle of the reel so as to be operated in any of the angular positions of the latter. Preferably the handle is connected with the spool, so that it may be released from the latter by a reverse rotation of the handle. The brake may be applied either by a continued reverse movement of the handle or by a forward movement from the position in which the spool is disconnected from the handle.

In the drawings, wherein I have shown several embodiments of my invention, Figure 1 is an axial section of the reel provided with one form of my invention. Fig. 2 is a view of the reel-cap removed. Fig. 3 is an enlarged section showing the braking mechanism in detail. Fig. 4 is a modified form of the braking mechanism. Fig. 5 is a view similar to Fig. 3, illustrating a modification of my device. Fig. 6 is a detail view of a modified form of disconnecting means.

Referring to Figs. 1 and 2, let A indicate the spool of a reel, the shaft B of which is provided with a pinion C, which is adapted to be turned by a gear D. E is the handle, which is connected with the gear D in the manner best shown in Fig. 3. The handle has connected to it a shaft F, which at its inner end is mounted to turn upon the stud G, fixed to the reel-frame. The shaft is provided with a left-hand thread, upon which is screwed a ratchet-wheel H. The gear D is adapted to turn loosely upon the shaft F when the parts are in the position shown in Fig. 1. When the handle is turned forwardly, however, the ratchet remains substantially stationary, or at least turns less rapidly than the shaft F, and the shaft moves outwardly, thus clamping the gear D between the ratchet and a shoulder I, formed on the inner end of the shaft. On either side of the gear D is preferably mounted a friction device of some kind, such as a leather washer J, as shown in Fig. 3, or a spring J', as shown in Fig. 4, or some other device which will provide for a gradual clamping of the gear. By this means as the handle is moved forwardly the friction devices are gradually applied to the gear, with the effect that a variable braking force is produced upon the latter, thus gradually altering the tension upon the line. It is to be understood that by properly proportioning the friction devices and other parts of the mechanism any desired graduation of the braking force may be obtained. Preferably the parts will be so provided that a considerable sweep of the handle is necessary to apply the entire braking force, so that no minute movement will be required to adjust such force. It will be understood, however, that it is a part of my invention to utilize this mechanism or any other which comes within the purview of my invention as a means for merely connecting and disconnecting the handle to and from the reel. In this case the braking feature may be omitted and the parts proportioned so as to release the spool and reëngage it by an extremely small movement of the handle or other part adapted to perform the functions thus described.

In the construction described, as the handle is moved forwardly the gear becomes more firmly clamped until the friction is sufficient to overcome the tension on the line, when the latter may be reeled in. In this construction the parts tend to release themselves when there is a pull or jerk upon the line, so that there is no danger of the parts unintentionally becoming fast. When the parts are thus clamped and it is desired to release the spool, the handle is turned backward. To prevent a reverse rotation of the ratchet during this movement, I provide a pawl K, which engages the nearest ratchet-tooth, and thus holds the ratchet while the movement of the handle screws the shaft F inwardly, thus releasing the parts. The construction just described constitutes a positive means for disengaging the handle from the spool as distinguished from constructions wherein the mere friction of the parts is relied upon to effect a separation thereof. The pawl constitutes a substantially rigid member against which the ratchet acts in separating the parts. Hence the separation is prompt and positive in any of the angular positions of the handle. The reverse rotation instead of being carried to the extent of fully releasing the parts may be carried only so far as to partially release them to the desired extent, thus permitting the gear to rotate under the stress of the line, but applying the required degree of braking force. For the pawl may be substituted any other device—as, for instance, that shown at T, Fig. 6. Such device comprises a wedging member bearing against a disk $H^2$, which corresponds to the ratchet H. This construction permits forward movement of the disk, but prevents rearward movement thereof. In this construction the slight click of the ratchet and pawl is avoided. Many other ways can be adopted for producing this result.

To provide means for holding the handle in its adjusted positions, I may provide a collar O, which is screw-threaded into the collar P of the reel with a right-hand thread, which may be adjusted so as to engage the handle at any desired point.

Instead of causing the braking mechanism to operate by a forward rotation of the handle from the position of disengagement with the gear I may apply the braking force by a still further backward rotation of the handle, this construction being shown in Fig. 5. In this construction the ratchet H' is adapted to be pressed against the side of the gear D by the forward rotation of the handle without the intervention of any friction device, so that the engagement is sharp. On reverse rotation of the handle the pawl engages the ratchet as before and separates the parts, after which the gear is forced toward the spool by a shoulder L, fast on the shaft F', until it engages a friction device $J^2$, fast on the reel-frame. By proper movements of the handle any desired degree of braking force may be thus applied. A shoulder M, also fast on the shaft F', draws the gear toward the ratchet on the forward movement of the handle.

It will be understood that I have shown the two constructions herein described merely as examples for illustrating my invention and that I do not wish to be limited thereto, since many devices may be constructed which embody the gist of my invention, which is to provide means whereby a braking effect may be placed upon the line by the hand of the user which operates the reel-handle. A subsidiary but important feature of my invention is to provide a reel wherein the handle may be positively disconnected from the spool by a reverse relative movement of the handle and connected therewith by a forward movement thereof.

What I claim is—

1. In a fishing-reel, the combination of a spool, a handle for rotating it, said handle being fixed against lateral movement, and means connected with the handle for applying a variable braking effect upon the line.

2. In a fishing-reel, the combination of a spool, a laterally-unyielding handle for rotating it, and a brake operated by movements of said handle.

3. In a fishing-reel, the combination of a spool, a handle for rotating it, and a brake operated by a rotative movement of said handle.

4. In a fishing-reel, the combination of a spool, a handle for rotating it, and a brake operated by a forward movement of the handle.

5. In a fishing-reel, the combination of a spool, a laterally-unyielding handle for rotating it, means for disconnecting such handle from such spool, and means for braking such spool operated by said handle.

6. In a fishing-reel, the combination of a spool, a handle for rotating it, such handle being adapted to be disconnected from such spool, whereby to permit the latter to run free, and means for braking the spool adapted to be operated by a rotative movement of such handle.

7. In a fishing-reel, the combination of a spool, a handle for rotating it, such handle being adapted to be disconnected from such spool, whereby to permit the latter to run free, and means for braking the spool adapted to be operated by a forward movement of such handle.

8. In a fishing-reel, the combination of a spool, a handle for operating it, means for disconnecting the handle from the spool by a relative reverse rotative movement thereof, such means including two parts normally in engagement, and means for preventing the movement of one of such parts during such relative movement, whereby the handle and spool are positively disconnected.

9. In a fishing-reel, the combination of a spool, a handle, and a screw-operated member adapted to produce a variable braking effect upon the line, such member being actuated by said handle.

10. In a fishing-reel, the combination of a spool, a handle, a screw-threaded shaft turned by said handle, and a braking mechanism for said spool operated by said shaft.

11. In a fishing-reel, the combination of a spool, a handle, a gear connected with said spool, and means operated by said handle for producing a graduated braking effect upon said gear.

12. In a fishing-reel, the combination of a spool, a handle, a screw-threaded shaft turned by said handle, a gear connected with said spool, and means operated by said shaft for producing a graduated braking effect upon said gear.

13. In a fishing-reel, the combination of a spool, a handle, and a braking device for said spool operated by said handle, said braking device being adapted to be operated to release the spool when the latter is unwound.

14. In a fishing-reel, the combination of a spool, a brake therefor, and a rotatable handle adapted to gradually apply such brake, and means for holding such brake in its adjusted positions.

15. In a fishing-reel, the combination of a spool or the like, a brake therefor, and a rotatable handle adapted to gradually apply such brake and means for holding the handle in its adjusted positions.

16. In a fishing-reel, the combination of a spool, a brake therefor, and a rotatable handle adapted to gradually apply such brake, and means for holding the handle in its adjusted positions, said means being adapted to permit the free forward movement of such handle.

17. In a fishing-reel, the combination of a spool, a brake therefor, and a rotatable handle adapted to gradually apply such brake and means for holding the handle in its adjusted positions, said means comprising a collar adapted to engage such handle, and adapted to be moved toward and from the same.

In witness whereof I have hereunto signed my name in the presence of two subscribing witnesses.

EUGENE V. MYERS.

Witnesses:
 FRED WHITE,
 RENÉ BRUINE.